United States Patent
Chang

(10) Patent No.: US 10,783,069 B2
(45) Date of Patent: Sep. 22, 2020

(54) DATA STORAGE DEVICE AND DATA STORAGE METHOD FOR DETECTING CURRENTLY-USED LOGICAL PAGES USING LEAPING LINEAR SEARCH WITH DECREASING STEP

(71) Applicant: Silicon Motion, Inc., Jhubei, Hsinchu County (TW)

(72) Inventor: Chiu-Han Chang, Taipei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 22 days.

(21) Appl. No.: 15/853,453

(22) Filed: Dec. 22, 2017

(65) Prior Publication Data
US 2018/0341578 A1 Nov. 29, 2018

(30) Foreign Application Priority Data
May 26, 2017 (TW) .............. 106117576 A

(51) Int. Cl.
*G06F 12/02* (2006.01)
*G06F 3/06* (2006.01)
*G06F 11/10* (2006.01)

(52) U.S. Cl.
CPC .......... *G06F 12/0246* (2013.01); *G06F 3/064* (2013.01); *G06F 3/0619* (2013.01);
(Continued)

(58) Field of Classification Search
CPC .. G06F 12/0246; G06F 3/0619; G06F 3/0679; G06F 3/064; G06F 2212/7201;
(Continued)

(56) References Cited

U.S. PATENT DOCUMENTS 8,065,304 B2 11/2011 Ross
9,361,991 B1 * 6/2016 Ng ..................... G11C 11/5628
(Continued)

FOREIGN PATENT DOCUMENTS

CN 103299283 B 8/2016
TW 201234177 A 8/2012
(Continued)

OTHER PUBLICATIONS https://www.tutorialspoint.com/Jump-Search, "Jump Search", Arushi, Tutorialspoint, Jul. 4, 2018, all pages.*

*Primary Examiner* — Hong C Kim
(74) *Attorney, Agent, or Firm* — McClure, Qualey & Rodack, LLP

(57) ABSTRACT

A data storage device utilized for storing a plurality of data, wherein the data storage device includes a memory and a controller. The memory includes a plurality of blocks, and each of the blocks includes a plurality of physical pages. The controller is coupled to the memory and maps the logical pages to the physical pages of the memory, and it performs a leaping linear search for the logical pages. The controller searches the Nth logical page of the logical pages according to a predetermined value N. N is a positive integer greater than 1. When the Nth logical page is a currently-used logical page, the controller incrementally decreases the predetermined value N to keep searching the logical pages until a non-currently-used logical page is detected.

14 Claims, 6 Drawing Sheets

(52) U.S. Cl.
CPC ........ *G06F 3/0679* (2013.01); *G06F 11/1068* (2013.01); *G06F 2212/7201* (2013.01)

(58) Field of Classification Search
CPC .. G06F 11/1068; G06F 3/0604; G06F 3/0638; G06F 3/0658; G06F 11/1012
USPC .................. 711/103, 154; 707/706, 758, 781
See application file for complete search history.

(56) References Cited

U.S. PATENT DOCUMENTS

| | | | |
|---|---|---|---|
| 2014/0258588 A1* | 9/2014 | Tomlin | G06F 12/0246 711/103 |
| 2018/0011646 A1* | 1/2018 | Yeh | G06F 3/065 |
| 2018/0356802 A1* | 12/2018 | Liu | G05B 19/41865 |

FOREIGN PATENT DOCUMENTS

| | | |
|---|---|---|
| TW | 201405309 A | 2/2014 |
| TW | 201525691 A | 7/2015 |
| TW | 201616363 A | 5/2016 |

\* cited by examiner

DATA STORAGE DEVICE AND DATA STORAGE METHOD FOR DETECTING CURRENTLY-USED LOGICAL PAGES USING LEAPING LINEAR SEARCH WITH DECREASING STEP

CROSS REFERENCE TO RELATED APPLICATIONS

This Application claims priority of Taiwan Patent Application No. 106117576 filed on May 26, 2017, the entirety of which is incorporated by reference herein.

BACKGROUND OF THE INVENTION

Field of the Invention

The disclosure generally relates to a data storage device and a data storage method, and more particularly, to a data storage method which detects logical pages to discover the one that is truly the last currently-used logical page.

Description of the Related Art

When a data storage device (such as FLASH memory) is utilized by a user, power to the device might abnormally or accidentally turn off during the process of writing data. In these situations, not only will the page being written be affected, but other pages related to that page will also be affected. When the data storage device is detected by the controller to discover the actual last currently-used page, there could be misjudgments caused by other affected pages.

For example, other affected pages are actually blank pages on which data is not written. However, the controller determines that the page is the currently-used page because of the effect of an abnormal power-off. Accordingly, problems might occur when writing subsequent data. Therefore, what is needed are a data storage device and a data storage method for effectively detecting pages and discovering the actual last currently-used page.

BRIEF SUMMARY OF THE INVENTION

In order to solve the aforementioned problem, the invention proposes a data storage device and a data storage method to effectively determine whether a page is truly currently-used or not. Specifically, the data storage method of the present invention performs a linear search for the multiple logical pages. The specific logical page of the logical pages is searched based on a predetermined value. When the specific logical page is a currently-used logical page, the predetermined value is incrementally decreased to keep searching the logical pages until a non-currently-used logical page is detected in order to detect an actual last currently-used logical page. Therefore, the data storage device and data storage method of the present invention can avoid misjudgments and accurately discover the actual last currently-used page.

In one aspect of the invention, the present invention provides a data storage device utilized for storing a plurality of data. The data storage device includes a memory and a controller. The memory includes a plurality of blocks. Each of the blocks includes a plurality of physical pages. The controller is coupled to the memory and maps a plurality of logical pages to the physical pages of the memory, and it performs a leaping linear search for the logical pages. The controller searches the Nth logical page of the logical pages according to a predetermined value N. N is a positive integer greater than 1. When the Nth logical page is a currently-used logical page, the controller incrementally decreases the predetermined value N to keep searching the logical pages until a non-currently-used logical page is detected.

When the controller detects the non-currently-used logical page, the controller detects whether a previous logical page of the non-currently-used logical page is a currently-used logical page or not, and when the previous logical page is the currently-used logical page, the controller determines that the previous logical page is the last currently-used logical page. When the previous logical page is not the currently-used logical page, the controller keeps detecting another previous logical page of the previous logical page until the last currently-used logical page is detected. In another embodiment, when the controller detects a non-currently used logical page, the controller performs a binary search for a plurality of logical pages which are upward from the non-currently-used logical page to detect the last currently-used logical page.

In another aspect of the invention, the present invention provides a data storage method utilized for a host and a data storage device for storing a plurality of data. The data storage device includes a memory and a controller, the controller maps a plurality of logical pages to the physical pages of the memory. The data storage method includes performing a linear search for the logical pages. The controller searches Nth logical page of the logical pages according to a predetermined value N which is a positive integer greater than one. The data storage method also includes incrementally decreasing the predetermined value N whenever the Nth logical page is a currently-used logical page, to keep searching the logical pages until a non-currently-used logical page is detected.

BRIEF DESCRIPTION OF DRAWINGS

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

Figure 1A:
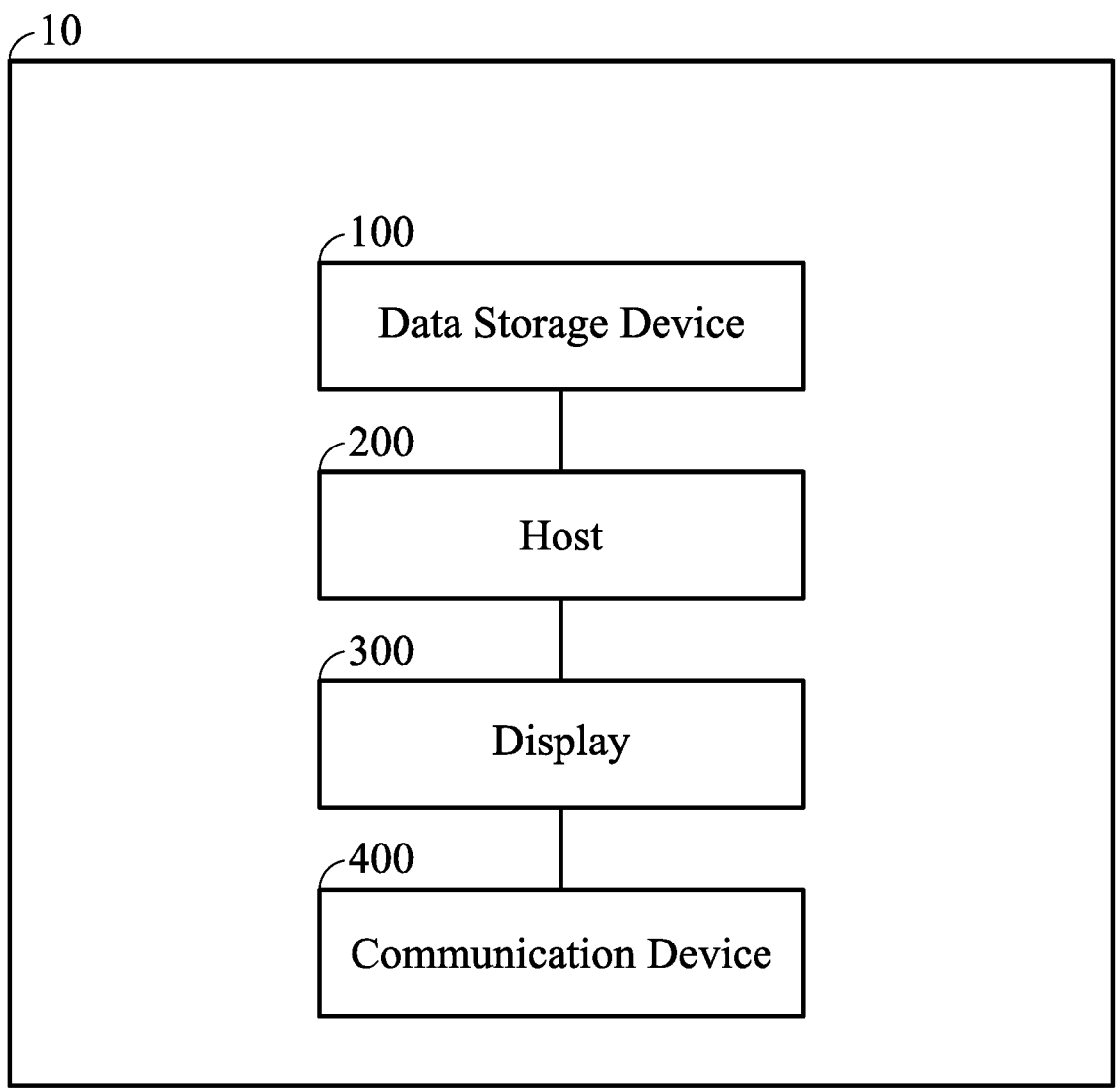
FIG. 1A is a schematic diagram of an electronic device according to an embodiment of the invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1A is a schematic diagram of an electronic device 10 according to an embodiment of the invention. The electronic device 10 includes a data storage device 100, a host 200, a display 300 and a communication device 400. The electronic device 10 could be mobile electronic devices such as cell phones, tablet computers, laptop computers, gaming apparatuses, electronic books or PDAs, or could be electronic devices such as desktop calculators, servers, ticket machines, digital picture frames, point-of-sale terminals or digital maps, or could be any electronic device equipped with a touch connection module (such as a touch IC). The data storage device 100 includes one or a plurality of a random access memory (RAM), a read-only memory (ROM), a flash memory, a hard disk, a soft disk, a magnetic memory, a compact disc (CD) and a digital video disk (DVD). The details of components and function of the data storage device 100 will be illustrated in FIG. 1B.

In addition, the host 200 of the electronic device 10 is coupled to the data storage device 100 to access the data of the data storage device 100. The host 200 could include a digital signal processor (DSP), a microcontroller (MCU), a central-processing unit (CPU) or a plurality of parallel processors relating the parallel processing environment to implement the operating system (OS), firmware, driver and/or other applications of the electronic device. The display 300 is utilized to display the data of the data storage device 100. The display 300 could be touch display panels such as resistive touch panels, capacitive touch panels, optical touch panels or electromagnetic touch panels. The communication device 400 supports various protocols of wireless communication. For example, the protocol of wireless communication could constitute GSM, GPRS, EDGE, UMTS, W-CDMA, CDMA2000, TD-CDMA, Bluetooth, NFC, WiFi, WiMAX, LTE, LTE-A or TD-LTE.

Figure 1B:
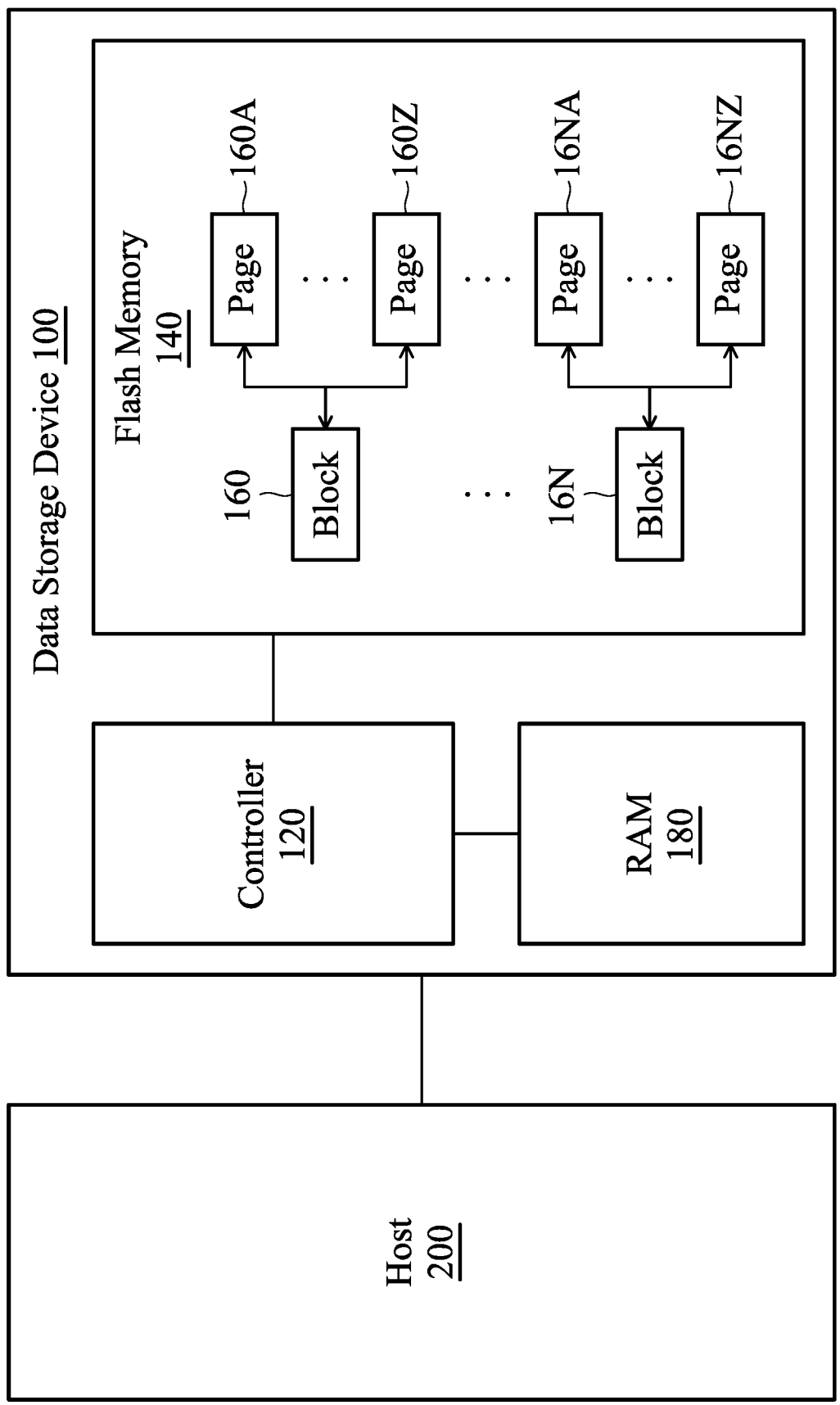
FIG. 1B is a schematic diagram of a data storage device and a host according to an embodiment of the invention.

FIG. 1B is a schematic diagram of a data storage device 100 and a host 200 according to an embodiment of the invention. In one embodiment, the data storage device 100 includes a controller 120, a flash memory 140 and a RAM 180. The data storage device 100 is coupled to the host 200 to transmit data and instructions or to receive data and instructions. The flash memory 140 could be non-volatile memory such as NAND flash. The data storage device 100 complies with the eMMC standard and the UFS standard.

As shown in FIG. 1B, the controller 120 is coupled to the flash memory 140 and the RAM 180. The RAM 180 is utilized to temporarily store and cache the data which is needed by the controller 120, or temporarily store the data which will be written to the flash memory 140 by the host 200 in order to facilitate the access time of the data storage device 100. The controller 120 performs a reading operation on the flash memory 140 by controlling the flash memory 140 with the unit of a cluster. In addition, the controller 120 is coupled to the flash memory 140 to transmit data and instructions or to receive data and instructions mutually. Furthermore, the controller 120 can be a read-only-memory (ROM) and a micro-controller with firmware code, and the micro-controller executes the firmware code to operate or access the flash memory 140.

The flash memory 140 includes a plurality of blocks 160A~160N. Specifically, each of the blocks 160A~160N further includes a plurality of physical pages 160A~16NZ. The block 160 includes physical pages 160A~160Z, and the block 16N includes physical pages 16NA~16NZ. When the controller 120 performs a writing operation or a programming operation on the flash memory 140, it controls the flash memory 140 to perform the writing or programming operation with the unit of a physical page.

Regarding the flash memory 140, each of the physical pages 160A~16NZ has a different physical address. In other words, each of the physical pages 160A~16NZ has a physical address, and each physical address of the physical pages 160A~16NZ is different. When a writing operation is executed by the data storage device 100, the controller 120 determines the physical address of the flash memory 140 for writing or storing data. In addition, the physical addresses are mapped to a plurality of respective logical addresses by the controller 120. Therefore, for the host 200, the host 200 reads or writes data which is stored in a logical address by the data storage device 100 through the logical address.

The controller 120 maps logical pages to the physical pages of the flash memory 140 based on the sequence of the logical pages, and it detects status of data stored by the above physical pages corresponding to the flash memory 140. In one embodiment, the controller 120 detects whether or not each of the logical pages is a currently-used logical page according to a leaping linear search or a binary search. When each bit of a logical page is 1, the controller 120 determines that the logical page is blank page; when not every bit of a logical page is 1, the controller 120 determines that the logical page is a currently-used logical page. Specifically, whether each bit of the above logical page is 1 or not is determined by hardware.

In another embodiment, when ECC occurs on the logical page, the controller 120 determines that the logical page is the currently-used logical page. For example, specifically, the controller 120 detects the ECC bit number of the above logical page to determine whether data stored in the logical page is error. When ECC bit number is low, the controller 120 determines that the data is correct, and the ECC recovery is successful. When ECC bit number is high, the controller 120 determines that the data is wrong, and the ECC recovery fails. It should be noted that the controller 120 determines that the logical pages is currently-used no matter the ECC bit number is high or low, or the ECC recovery is successful or not.

Whether a logical page is currently-used or not could be determined by the controller 120 with the above method. However, the currently-used logical page determined by the controller 120 might not be the real currently-used logical page, and it is misjudged as the currently-used logical page because of the abnormal power-off. Therefore, a data storage device and a data storage method for detecting pages efficiently are needed to confirm that the currently-used logical page determined by the controller 120 is real currently-used page with written data.

Figure 2:
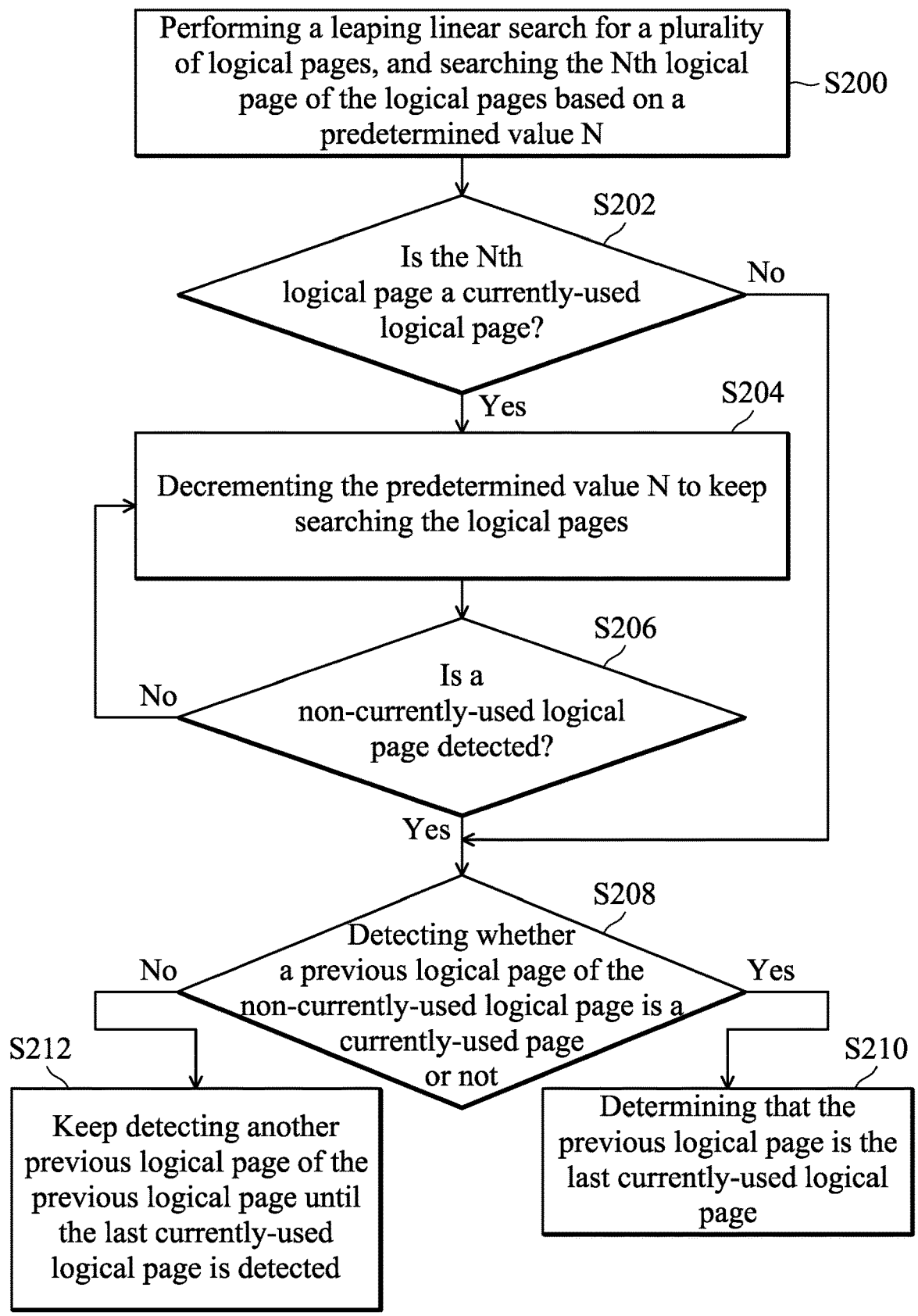
FIG. 2 is a flowchart of a data storage method according to an embodiment of the invention.

FIG. 2 is a flowchart of a data storage method according to an embodiment of the invention. In step S200, the controller 120 performs a leaping linear search for a plurality of logical pages. At the beginning, the controller 120 searches the Nth logical page of the logical pages based on a predetermined value N. It should be noted that the value N is an integer greater than one. In step S202, the controller 120 determines whether the Nth logical page is a currently-used logical page or not. When the Nth logical page is not a currently-used logical page, step S208 will be executed.

When the Nth logical page is a currently-used logical page, step S204 will be executed that the controller 120 incrementally decreases the predetermined value N to keep searching the logical pages.

Afterwards, in step S206, the controller 120 determines whether a non-currently-used logical page is detected or not. When a non-currently-used logical page is not detected, step S204 will be executed. When a non-currently-used logical page is detected, step S208 will be executed. In step S208, the controller 120 detects whether a previous logical page of the non-currently-used logical page is a currently-used page or not. When the previous logical page of the non-currently-used logical page is a currently-used page, step S210 will be executed. In step S210, the controller 120 determines that the previous logical page is the last currently-used logical page. When the previous logical page of the non-currently-used logical page is not a currently-used page, step S212 will be executed that the controller 120 keeps detecting another previous logical page of the previous logical page until the last currently-used logical page is detected.

Figure 3:
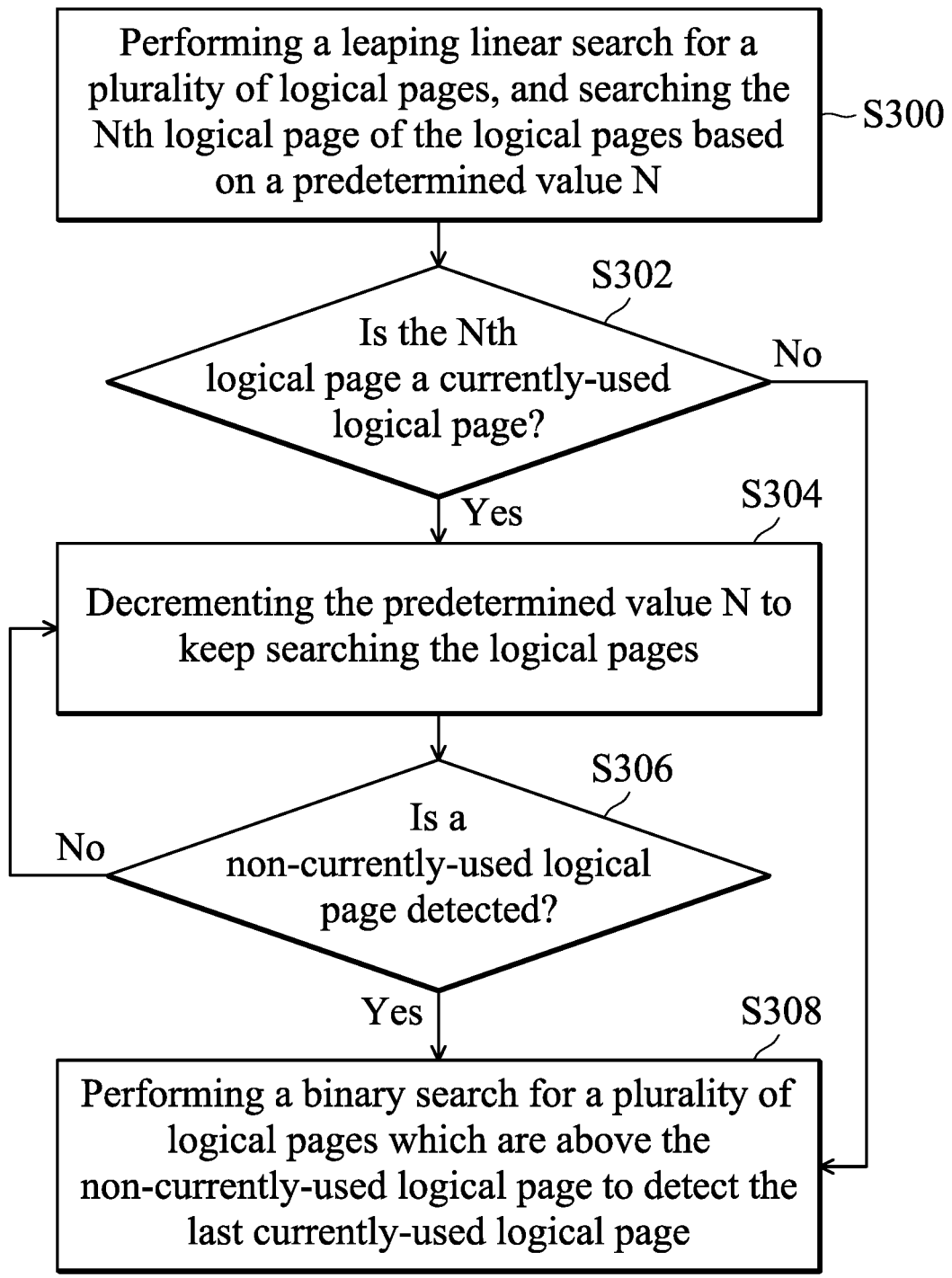
FIG. 3 is a flowchart of a data storage method according to another embodiment of the invention.

FIG. 3 is a flowchart of a data storage method according to another embodiment of the invention. In step S300, the controller 120 performs a leaping linear search for a plurality of logical pages, and searches the Nth logical page of the logical pages based on a predetermined value N. In step S302, the controller 120 determines whether the Nth logical page is a currently-used logical page or not. When the Nth logical page is not a currently-used logical page, step S308 will be executed. When the Nth logical page is a currently-used logical page, step S304 will be executed that the controller 120 incrementally decreases the predetermined value N to keep searching the logical pages. In step S306, the controller 120 determines whether a non-currently-used logical page is detected or not. When a non-currently-used logical page is not detected, step S304 will be executed. When a non-currently-used logical page is detected, step S308 will be executed. In step S308, the controller 120 performs a linear search for a plurality of logical pages which are above the non-currently-used logical page to detect the last currently-used logical page.

Figure 4:
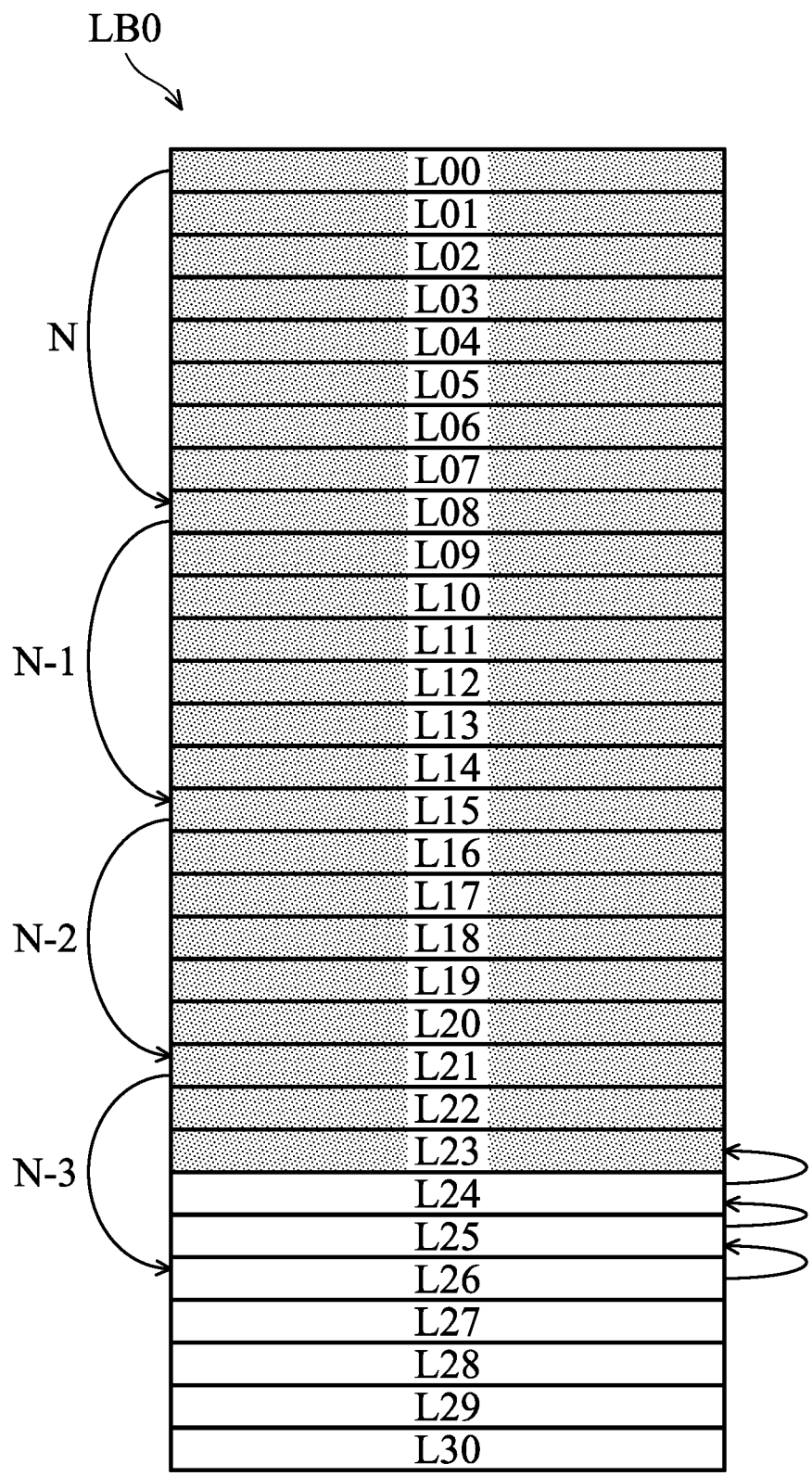
FIG. 4 is a schematic diagram of a logical page according to an embodiment of the invention.

FIG. 4 is a schematic diagram of a logical page according to an embodiment of the invention, which corresponds to the data storage method as shown in FIG. 2. In the embodiment of FIG. 4, the logical block LB0 includes 31 logical pages L00~L30. The logical pages L00~L23 are currently-used logical pages, and the logical pages L24~L30 are not currently-used logical pages. For example, the logical block LB0 corresponds to one or several blocks of the blocks 160~16N of FIG. 1B. Anyone of the logical pages L00~L31 corresponds to one or several physical pages 160A~16NZ of FIG. 1B. In one embodiment, a logical block includes M logical pages. M is a positive integer greater than one, and N is the minimum value which complies with the following formula:

$$(N \times (N+1))/2 \geq M$$

In the embodiment of FIG. 4, M is 31, and N could be calculated to be 8 by the controller 120 based on the above formula in order to determine that the predetermined value N is 8. Afterwards, the controller 120 performs the leaping linear search for the logical pages L00~L30 in order to discover the last currently-used logical page. At first, the controller 120 detects whether the most front logical page L00 is a currently-used logical page or not. Because the logical page L00 is a currently-used logical page, 8 logical pages are skipped downwards based on the predetermined value N (N=8) in order to detect whether the eighth logical page L08 is a currently-used logical page or not. Afterwards, the controller 120 determines that the logical page L08 is a currently-used logical page, and the controller 120 incrementally decreases the predetermined value N (which means N−1=7). In addition, seven other logical pages are skipped downwards in order to detect whether the logical page L15 is a currently-used logical page or not. When the logical page L15 is a currently-used page, the predetermined value N will be incrementally decreased again (incrementally decreased twice, which means N−2=6), and 6 other logical pages are skipped downwards to the logical page L21 until a non-currently-used logical page is detected.

In the embodiment, when the controller 120 determines that the logical page L26 is a non-currently-used page, the predetermined value N is no longer incrementally decreased, and the controller 120 searches forward to discover the last currently-used logical page. Specifically, the controller 120 detects whether the previous logical page L25 of the logical page L26 is a currently-used logical page or not. If yes, it means that the logical page L25 is the last currently-used logical page. If not, the controller 120 keeps detecting whether the previous logical page L24 of the logical page L25 is a currently-used logical page or not, and so on. As shown in FIG. 4, when the controller 120 detects a non-currently-used logical page L26, it detects other logical pages upwards one by one in order to discover that the logical page L23 is the last currently-used logical page.

Generally, the writing of data of the logical pages is continuous. When there is no damage, the currently-used logical pages will also be continuous (such as the logical pages L00~L23 as shown in FIG. 4). Regarding the data storage method of the present invention, the predetermined value will not be incrementally decreased until a non-currently used logical page is detected by the downward searching of the leaping linear search, and the upward search starts in order to discover the last currently-used logical page. Since the predetermined value is incrementally decreased every time a downward search is performed, the searching amount for detecting the last currently-used pages remains the same. Even if the last currently-used logical page is on the bottom of the logical block, not much time is spent searching since the searching amount is fixed. Therefore, the performance of the data storage device will not be affected.

It should be noted that incrementally decreasing the predetermined value of the 31 logical pages L00~L30 to perform the leaping linear search is merely used for illustration, and not for limiting the present invention. In other embodiments, when the logical block includes thousands of logical pages or several tens of thousands of logical pages, the controller 120 can incrementally decrease the predetermined value for more logical pages to perform the leaping linear search and effectively decrease the search time.

Furthermore, in order to avoid misjudgments caused by an empty page (which indicates a non-currently-used logical page among the continuous currently-used logical pages), when the last currently-used logical page L23 is discovered, the controller 120 will further detect another logical page L22 upwards. As shown in FIG. 4, since the logical page L22 is also a currently-used logical page, the controller 120 could determine that the logical page L23 is the actual last currently-used logical page to avoid misjudgment and improve the accuracy of searching.

Figure 5:
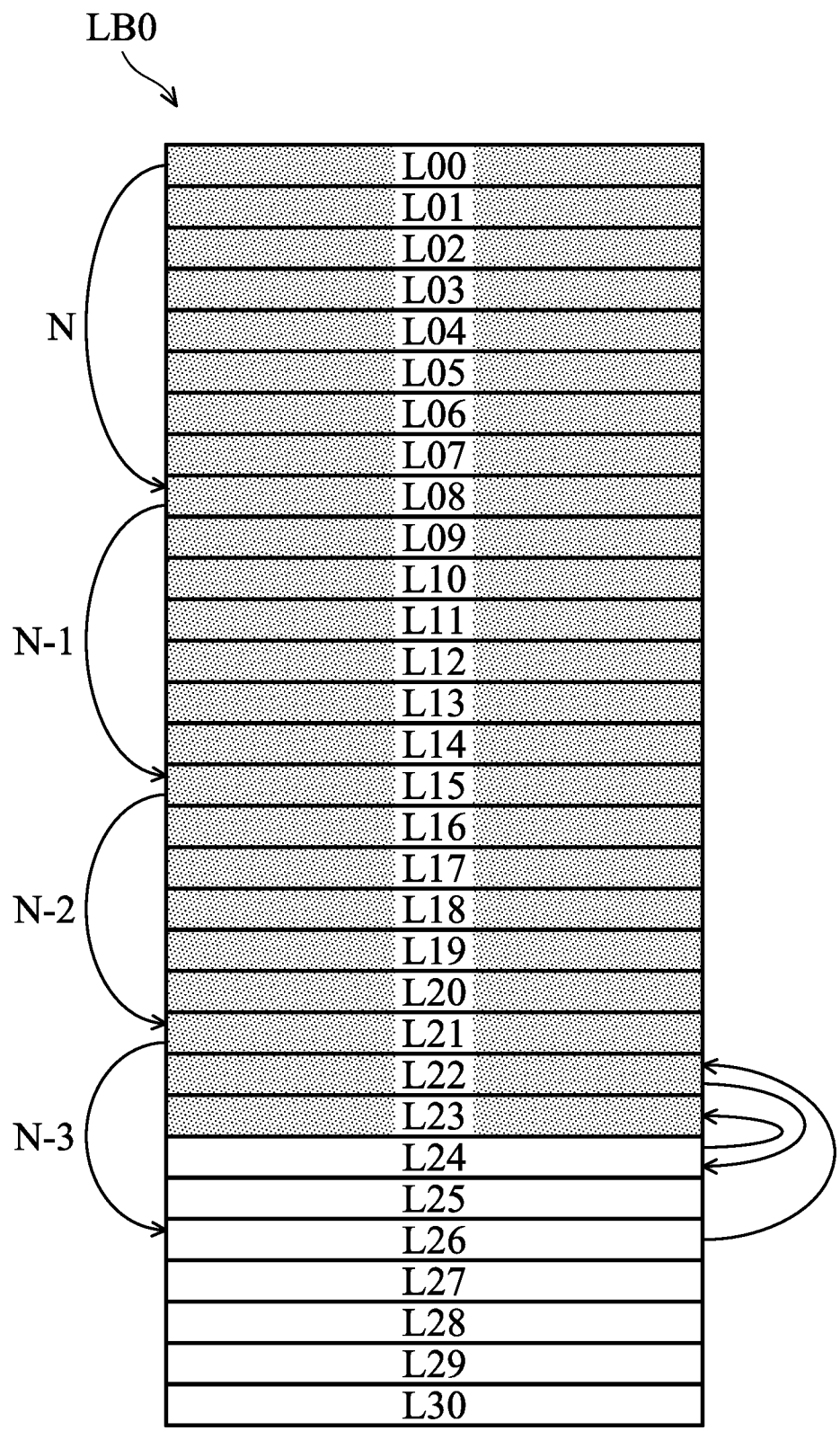
FIG. 5 is a schematic diagram of a logical page according to another embodiment of the invention.

FIG. 5 is a schematic diagram of a logical page according to another embodiment of the invention, which corresponds to the data storage method of FIG. 3. The arrangement of the logical block LB0 of FIG. 5 is identical to that of FIG. 4, and it will not be repeated again. As shown in FIG. 4, the controller 120 incrementally decreases the predetermined value N to execute a leaping linear search and to discover the non-currently-used logical page L26. Afterwards, the linear search is utilized to discover the logical pages upwards which are prior to the logical page L26 in order to discover the last currently-used logical page. The currently-used logical pages are continuous, and the logical page L21 is a currently-used logical page which has been detected by the leaping linear search. Therefore, the controller 120 could determine that the last currently-used logical page will be located between the logical pages L22~L25. In other words, the controller 120 of the present invention merely needs to perform the linear search for the logical pages L22~L25, it does not need to perform the linear search for the logical pages L00~L25 to improve the searching efficiency.

The binary searching method is illustrated as follows. After the logical page L26 is searched, the controller 120 skips four pages upwards to detect whether the logical page L22 is currently-used or not. Since the logical page L22 is currently-used, the controller 120 skips two page downwards (which is half of the four pages) to search the logical page L24. In addition, the logical page L24 is not a currently-used logical page, the controller 120 skips one page upwards (which is half of two pages) to search the logical page L23. When the logical page L23 is detected to be a currently-used logical page, the controller 120 could determine that the logical page L23 is the last currently-used logical page, since the previous logical page L22 is also a currently-used logical page.

It should be noted that incrementally decreasing the predetermined value for the four logical pages L08, L15, L20, and L26 to perform the leaping linear search is merely for illustration, not for limiting the present invention. In other embodiments, when the logical block includes thousands of logical pages or several tens of thousands of logical pages, the controller 120 can incrementally decrease the predetermined value for more logical pages to perform the leaping linear search and effectively decrease the search time.

By utilizing the data storage device and data storage method of the present invention, when a currently-used logical page is detected, the page of the previous address of the detected page will be further detected to determine whether it is currently-used or not. If the page of the previous address is a blank page, it means that the page is not a real currently-used page. If the page of the previous address is a currently-used page, it means that the page is a real currently-used page. Therefore, the data storage device and data storage method of the present invention can avoid misjudgments and discover the real last currently-used page.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name to distinguish the claim elements. While the invention has been described by way of example and in terms of the preferred embodiments, it should be understood that the invention is not limited to the disclosed embodiments. On the contrary, it is intended to cover various modifications and similar arrangements. Therefore, the scope of the appended claims should be accorded the broadest interpretation so as to encompass all such modifications and similar arrangements.

What is claimed is:

1. A data storage device, utilized for storing a plurality of data, comprising:
   a memory, comprising a plurality of blocks, wherein each of the blocks comprises a plurality of physical pages; and
   a controller, coupled to the memory, and configured to map a plurality of logical pages to the physical pages of the memory and perform a leaping linear search for the logical pages using a predetermined value N which is a positive integer greater than one, and each time when a target logical page in a current iteration of the leaping linear search is a currently-used logical page, the predetermined value N is decreased by 1 to keep searching the logical pages for a next iteration of the leaping linear search until a non-currently-used logical page is detected,
   wherein each of the blocks comprises M logical pages, M is a positive integer greater than one, and N is the minimum value which complies with the following formula: $(N \times (N+1))/2 \geq M$.

2. The data storage device as claimed in claim 1, wherein when the controller detects the non-currently-used logical page, the controller detects whether a previous logical page of the non-currently-used logical page is a currently-used logical page or not, and when the previous logical page is the currently-used logical page, the controller determines that the previous logical page is the last currently-used logical page.

3. The data storage device as claimed in claim 2, wherein when the previous logical page is not the currently-used logical page, the controller keeps detecting another previous logical page of the previous logical page until the last currently-used logical page is detected.

4. The data storage device as claimed in claim 1, wherein when the controller detects the non-currently used logical page, the controller performs a binary search for a plurality of logical pages which are upward from the non-currently-used logical page to detect the last currently-used logical page.

5. The data storage device as claimed in claim 1, wherein when not every bit of the logical page is 1, the controller determines that the logical page is the currently-used logical page.

6. The data storage device as claimed in claim 1, wherein when ECC occurs on the logical page, the controller determines that the logical page is the currently-used logical page.

7. The data storage device as claimed in claim 1, wherein when the controller detects the non-currently-used logical page, the controller detects whether a previous logical page of the non-currently-used logical page is a currently-used logical page or not,
   wherein when the previous logical page is the currently-used logical page, the controller further determines whether a first logical page prior to the previous logical page of the non-currently-used logical page is a currently-used logical page or not,
   wherein when the first logical page is the currently-used logical page, the controller determines that the previous logical page of the non-currently-used logical page is the last currently-used logical page.

8. A data storage method, utilized by a data storage device for storing a plurality of data, wherein the data storage device comprises a memory and a controller, and the controller maps a plurality of logical pages to the physical pages of the memory, the data storage method comprising:

performing a leaping linear search for the logical pages using a predetermined value N which is a positive integer greater than one; and each time when a target logical page in a current iteration of the leaping linear search is a currently-used logical page, decreasing the predetermined value N by 1 for a next iteration of the leaping linear search to keep searching the logical pages until a non-currently-used logical page is detected, wherein each of the blocks comprises M logical pages, M is a positive integer greater than one, and N is the minimum value which complies with the following formula: $(N \times (N+1))/2 \geq M$.

9. The data storage method as claimed in claim 8, further comprising:

when the non-currently-used logical page is detected, detecting whether a previous logical page of the non-currently-used logical page is a currently-used logical page or not; and when the previous logical page is the currently-used logical page, determining that the previous logical page is the last currently-used logical page.

10. The data storage method as claimed in claim 9, wherein when the previous logical page is not the currently-used logical page, data storage method keeps detecting another previous logical page of the previous logical page until the last currently-used logical page is detected.

11. The data storage method as claimed in claim 8, further comprising:

when the controller detects a non-currently used logical page, performing a binary search for a plurality of logical pages which are upward from the non-currently-used logical page to detect the last currently-used logical page.

12. The data storage method as claimed in claim 8, wherein when not every bit of the logical page is 1, determining that the logical page is the currently-used logical page.

13. The data storage method as claimed in claim 8, wherein when ECC occurs on the logical page, determining that the logical page is the currently-used logical page.

14. The data storage method as claimed in claim 8, further comprising:

when the non-currently-used logical page is detected, detecting whether a previous logical page of the non-currently-used logical page is a currently-used logical page or not;

when the previous logical page is the currently-used logical page, determining whether a first logical page prior to the previous logical page of the non-currently-used logical page is a currently-used logical page or not;

when the first logical page is the currently-used logical page, determining that the previous logical page is the last currently-used logical page.

* * * * *